(12) United States Patent
Hofmann (10) Patent No.: US 12,004,645 B2
(45) Date of Patent: Jun. 11, 2024

(54) ARTICULATED ADJUSTABLE FOOT COMPRISING SUPPORT BASE

(71) Applicant: Otto Ganter GmbH & Co. KG Normteilefabrik, Furtwangen (DE)

(72) Inventor: Thilo Hofmann, Furtwangen (DE)

(73) Assignee: OTTO GANTER GMBH & CO. KG NORMTEILEFABRIK, Furtwangen (DE)

( * ) Notice: Subject to any disclaimer, the term of this patent is extended or adjusted under 35 U.S.C. 154(b) by 0 days.

(21) Appl. No.: 18/153,406

(22) Filed: Jan. 12, 2023

(65) Prior Publication Data
US 2023/0240444 A1 Aug. 3, 2023

(30) Foreign Application Priority Data
Jan. 17, 2022 (DE) ...................... 10 2022 100 897.5

(51) Int. Cl.
*A47B 91/02* (2006.01)
(52) U.S. Cl.
CPC .................... *A47B 91/02* (2013.01)
(58) Field of Classification Search
CPC ...................................... A47B 91/02
USPC ........ 248/181.1, 181.2, 188.9, 188.8, 188.91
See application file for complete search history.

(56) References Cited

U.S. PATENT DOCUMENTS

| | | | | |
|---|---|---|---|---|
| 2,606,048 A | * | 8/1952 | Livingston | B60R 1/06 403/24 |
| 2,753,586 A | * | 7/1956 | Metz | A47C 7/002 108/118 |
| 2,812,916 A | * | 11/1957 | Jonasson | A47G 33/1226 248/524 |
| 2,910,995 A | * | 11/1959 | Candido | A47B 91/066 248/362 |
| 3,099,103 A | | 7/1963 | Wright | |
| 3,335,989 A | * | 8/1967 | Bachmann | F16M 11/08 248/176.1 |
| 3,575,369 A | * | 4/1971 | Tetlow | F16M 11/2078 248/182.1 |
| 4,285,550 A | * | 8/1981 | Blackburn | F16C 29/046 384/49 |
| 4,382,637 A | * | 5/1983 | Blackburn | F16C 29/046 384/49 |
| 4,440,186 A | * | 4/1984 | Lottner | A61H 3/0288 135/84 |

(Continued)

FOREIGN PATENT DOCUMENTS

DE    42 26 986 A1    2/1994
DE    297 14 531 U1    11/1997

(Continued)

OTHER PUBLICATIONS

European Search Report for EP22209782 dated May 23, 2023.

*Primary Examiner* — Kimberly T Wood
(74) *Attorney, Agent, or Firm* — Browdy and Neimark, PLLC (57) ABSTRACT

An articulated adjustable foot, including a support base, designed at least partially in an elastomeric manner, including a mounting surface to rest on a support surface, and a ball receptacle, which is open on one side, for a ball that is attached to the end of a shaft. The ball receptacle is delimited beneath the ball by a reinforcement disk, which is embedded into the elastomer and has a central hole, in which the underside of the ball is supported.

9 Claims, 5 Drawing Sheets

(56) References Cited

U.S. PATENT DOCUMENTS

| | | | | |
|---|---|---|---|---|
| 4,766,976 A | * | 8/1988 | Wallick, Jr. | E06C 7/44 |
| | | | | 182/201 |
| 6,910,666 B2 | * | 6/2005 | Burr | F16M 7/00 |
| | | | | 248/188.4 |
| 9,309,920 B2 | * | 4/2016 | Li | F16C 11/106 |
| 10,059,529 B1 | * | 8/2018 | Kulkarni | F16M 7/00 |

FOREIGN PATENT DOCUMENTS

| | | |
|---|---|---|
| DE | 20 2013 006889 U1 | 9/2013 |
| DE | 10 2017 104179 A1 | 8/2018 |
| EP | 0 057 269 A2 | 8/1982 |

* cited by examiner

ARTICULATED ADJUSTABLE FOOT COMPRISING SUPPORT BASE

The invention relates to an articulated adjustable foot comprising a support base.

Adjustable feet ensure a secure footing of objects such as furniture or equipment in mechanical engineering. These are usually composed of a threaded shaft made of metal as well as a plate-shaped foot made of plastic or likewise made of metal. The height of the adjustable foot can be adapted by way of the thread and, as a result, the object situated thereabove can be levelled and adapted to differences in height of the ground. The shaft is often mounted in the foot base or support base by means of a ball joint. In this way, the support base can be positioned obliquely, thereby also compensating for an uneven surface (absence of parallelity). Shock-absorbing adjustable feet include an elastic component, made of an elastomer, for example, for vibration damping purposes.

To create the ball joint, the support base has a partial sphere-shaped receptacle in the elastomer for a ball, which is attached to the end of the shaft. The joint allows existing unevenness of the floors and surfaces, on which the mounting surface of the support base ends up resting, to be compensated for.

An adjustable foot can also be used to exert pressure on a surface by way of the support base, for example so as to decelerate a rotating cable reel.

The disadvantage of the known adjustable feet, however, is that the elastomer only establishes a form-locked joint with the ball, and thus with the stabilizing element, since the ball is merely inserted into the elastomer. Forces acting laterally on the support base, however, may cause the base to inadvertently detach from the ball.

A gap is present at the edge of the ball receptacle, which is open toward the top, in which grease and dirt residue can accumulate, resulting in impurities, bacteria and the formation of microorganisms. In certain sectors, in particular in the food and pharmaceutical industries, this can lead to hygiene problems. Covers, for example, are known thus far to avoid this problem, such as those disclosed in DE 297 14 531 U1, for example.

DE 297 14 531 U1 shows an articulated adjustable foot, comprising a support base having a mounting surface to rest on a surface as well as partial sphere-shaped receptacle for a ball that is attached to the end of a threaded spindle, wherein the receptacle is formed by a cavity in an elastomer situated within the support base.

Such adjustable feet have the problem that the installed elastomer is too soft and only designed for static forces acting linearly from above. As soon as lateral displacement forces act, such as, for example, in the case of a cable brake for exerting braking pressure, the ball can disengage itself from the ball receptacle.

It is therefore the object of the invention to design a support base comprising a ball joint of the type mentioned above in such a way that a controlled force transfer from the shaft onto the support base can be exerted.

The object is achieved according to the invention by the features of the independent claim, whereas advantageous embodiments and refinements of the invention can be derived from the dependent claims.

An advantageous feature is that the ball receptacle is delimited beneath the ball by a reinforcement disk, which is embedded in the elastomer in an integral and form-locked manner and has a central hole in which the underside of the ball is supported.

The reinforcement disk is preferably made of metal or a metal alloy, and preferably made of stainless steel. The thickness of the disk is selected such that the disk is able to absorb the forces to be expected, without any deformation occurring. A thin metal sheet in the millimeter range, for example 3.2 mm, can be mentioned as one example, wherein forces between 200 and 300 kg can act on a shaft having an M12 thread.

The height of the support base can range between 6.5 mm and 10.5 mm, for example, wherein the diameter can be 14 mm to 32 mm. Thicknesses between 1 mm and 3.2 mm may be present for the reinforcement disk. The bottom region can have a height between 0.9 mm and 1.7 mm, and the ball can have a diameter of 4.5 mm to 9.4 mm. All information shall be understood to be mentioned by way of example and does not represent any limitation of the present invention.

The reinforcement disk is joined to the elastomer by vulcanization. Elastomers are dimensionally stable, but elastically deformable plastic materials, the glass transition point of which is below the usage temperature. The plastic materials are able to elastically deform under tension and compression load, but thereafter return to the original, non-deformed shape thereof.

Various vulcanized elastomers having a wide variety of material requirements and raw rubber types are used for the respective applications and depending on individual specifications. Depending on the material pairing and need, the reinforcement disk and the elastomer are produced as rubber metal combinations, with as well as without adhesion promoters.

The material used is preferably a thermoplastic elastomer, acrylonitrile butadiene rubber (NBR) or natural rubber. Silicone rubber (MVQ) or polyurethane (TPU) is also possible.

In another embodiment, the reinforcement disk is embedded into an elastic plastic material by way of an injection molding process.

A bottom region is located beneath the reinforcement disk. The bottom region is a subregion of the elastomer or plastic material, depending on the embodiment, which is at least partially separated from the main elastomer or plastic material by the reinforcement disk. This bottom region thus forms an elastic support for the reinforcement disk to prevent the reinforcement disk from coming in direct contact with the surface on which the support base rests.

In an advantageous refinement, this bottom region has a different SHORE hardness compared to the remaining elastic body. The upper region can thus be softer, for example, so that the ball glides better, and the bottom region can be harder, so that the pressure can be transferred better to a surface on which the support base is located. This can enhance the wear resistance. In this way, it is also possible to influence the vibration behavior of the support base.

This is possible, among other things, through the use of a 2-component elastomer, which is processed by way of the injection molding method. The elastomer above the reinforcement disk can thus be harder than the second elastomer beneath the reinforcement disk. However, it is essential that a suitable integral joint with the reinforcement disk is possible.

It is also possible to generate a difference in color through the use of different elastomers, for example so as to embody the bottom-side elastomer in blue. In another embodiment of the invention, the elastomer is surrounded by a metal sheath, which, for example toward the top, includes a cut-out for feeding through the shaft, and is open fully toward the bottom. The metal sheath is used to protect the elastomer.

The reinforcement disk is annular and, in the axial center, has a hole including a funnel-shaped wall. The inside width of the hole is smaller than the diameter of the ball, wherein the underside of the ball is supported on the wall in a manner that is acted upon by a force. An annular shape is preferably used with round support pieces or corresponding to the shape of the support piece. Alternatively, a square, oval, elliptic, trapezoidal or rhombic shape of the reinforcement disk can also be used.

For the sake of simplicity, an annular shape is assumed hereafter, wherein this shall not be construed to be limiting with respect to the shape.

A detent opening in the elastomer is formed on the side of the support base which is located opposite the mounting surface. The detent opening is made up of a circumferential chamfer transitioning in a funnel-shaped manner into a collar, the inside with (W) of which is smaller than the ball diameter (D). The collar forms a circumferential expansion area for expanding the detent opening to a diameter extending around the equator of the ball. In this way, a plug detent connection is formed for the ball in the receptacle.

To prevent the shaft from detaching, the elastomer snaps back again after the ball has been inserted into the elastomer, wherein the diameter narrows, and the elastomeric collar holds the neck of the shaft in a form-locked, and preferably sealed, manner. The dimensioning of the collar is selected so that the elastomer always pulls the ball with tension into the ball receptacle, and the ball is thus held snapped in place in the receptacle.

The elastomer can thus be elastically expanded and, due to the elasticity thereof, has a restoring function. Another advantage is that the joint is substantially fully protected against soiling, such as dust or liquids. The ball is supported in a elastically form-locked manner and so as to glide in the hole. In this way, the ingress of foreign matter is also effectively prevented.

The partial sphere-shaped ball receptacle is also adapted to the outer contour of the ball so as to prevent the ingress of soiling, deposits, and the formation of microorganisms.

The sphere is thus joined to a neck protruding from the shaft in a manner that uses the same material. By way of the thread, it is possible to create a pressure piece or an adjustable foot for adjusting the position, bracing devices, or transferring loads.

The ball is provided preferably with a shaft, this being, for example, a threaded spindle or, in another embodiment, a smooth or profiled stud.

In any embodiment, the ball can be easily pressed into the support base and, if needed, can be removed again.

Here, the term "ball" shall not be understood to be limiting, and a spherically shaped pin or a conically tapering pin, having an undercut in the region of the neck of the elastomer body, is also encompassed by the present invention.

According to the invention, an elastomer element, which is reinforced or strengthened or stiffened by a metallic disk, is thus located in the support base. The reinforcement disk is integrally joined to the elastomer element, preferably by vulcanization.

The shaft is inserted into the detent opening, engages in the elastomer element, and ends up resting on the reinforcement disk. The force acting on the shaft is thus introduced into the reinforcement disk and absorbed by the elastomer, in particular by a bottom region beneath the reinforcement disk.

The depression of the hole is selected so as to generate a tangential support at the ball head. Forces are introduced from above via the shaft, which are passed on via the ball head to the reinforcement disk, and are thus introduced areally into the elastomer, without overloading the same in places. The load is thus distributed across the entire support surface.

The support base has a damping and noise-reducing effect and protects surfaces against damage. The latter is in particular achieved by an optional rubber pad on the mounting surface. The support base is thus also slip-resistant to a lateral movement. Moreover, the rubber pad has a protective property with respect to the support surface.

The adjustable foot can be used in arbitrary orientations, such as horizontally or vertically. Moreover, a use as a pressure piece is provided, wherein pressure that is transferred via the adjustable foot acts on a surface. Such a surface can be the braking surface of a cable reel, for example, wherein the cable reel is decelerated when pressure of the mounting surface of the support base is applied against the braking surface.

The articulated adjustable foot according to the invention, comprising a support base, shall be understood to be limited to being set up on a floor. The device according to the invention can also be used for the following uses, which are cited by way of example:
  as a brake piece, for example when the support base pushes on a brake disk, and thereby decelerates the disk by way of friction;
  as a pressure piece, for example when the support base is coupled at least one side to a tensioning cylinder;
  for introducing force into a component;
  for conserving or protecting a mounting surface by using n elastomer.

The method for embedding the reinforcement disk into the support base has the following features:

The disk is provided with a pretreatment at the surface that is later enclosed, which promotes integral bonding. During the production of the adjustable foot, the hole is used for handling and for positioning the reinforcement disk in the tool since, here, the disk is held spaced apart from the wall of the injection mold by way of a holder. Then, initially an injection molding and insert-molding operation, for example by way of compression or transfer injection insert-molding, with the elastomer base material takes place.

Thereafter, the vulcanization is carried out, wherein the reinforcement disk is held in the hole by the engagement of a holder.

The elastomer integrally bonds with the reinforcement disk.

The reinforcement disk is embedded in the elastomer, and a bottom region, which has resilient and damping properties, is formed between the mounting surface and the underside of the disk.

As a result of the production method, a bottom-side clearance remains open in the mounting surface, which can be used for visually checking the correct engagement state of the ball.

In another embodiment, the reinforcement disk, at the outer circumference thereof, includes rims that are bent upwardly or downwardly, which generate an additional bracing action when a force acts on the disk, which does not act perpendicularly from above. In this way, the forces introduced by an, oblique, shaft, can be better introduced into the elastomer.

The adjustable foot can be fastened to a device, for example, or protrude from a floor or wall region as a fixed installation.

In this way, the articulated adjustable foot according to the invention, comprising a support base, can absorb or transfer a force, wherein the conduction of the force between the support base and the shaft, by virtue of the coupling of the ball-shaped end of the shaft to the reinforcement disk within the elastomer of the support base, is enhanced, regardless of the orientation of the shaft relative to the axis of symmetry of the support base.

The subject matter of the present invention can be derived not only from the subject matter of the individual claims, but also from the combination of the individual claims with one another.

All information and features disclosed in the documents, including the abstract, and in particular the spatial configuration shown in the drawings, could be claimed as being essential to the invention, provided these are novel over the prior art, either individually or in combination. The use of the terms "essential" or "according to the invention" or "essential to the invention" is subjective and does not imply that the features described in this way necessarily have to be an integral part of one or more claims.

The invention will be described in greater detail hereafter based on drawings showing only one way to carry out the invention. Additional features that are essential to the invention and advantages of the invention can be derived from the drawings and their description.

Figure 1:
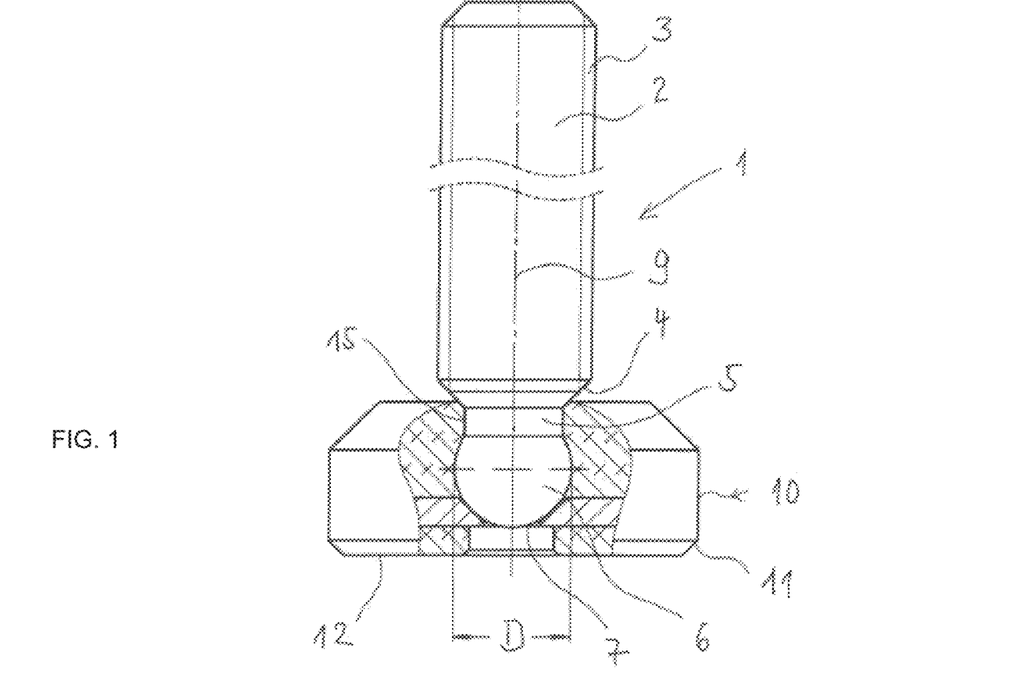
FIG. 1 shows a front view of the partially cut adjustable foot.

FIG. 1 shows an adjustable foot 1, which comprises a shaft 2 including a thread 3, configured as an external thread. A chamfer 4 adjoins beneath the thread 3, which reduces the diameter of the shaft and transitions into a neck 5, which forms the region having the smallest diameter of the shaft 2. A ball 6, which forms a workpiece-integral part of the shaft 2, adjoins this neck in the longitudinal direction.

The ball 6, the neck 5 and at least a portion of the chamfer 4 are inserted in the support base 10, which is arranged beneath the thread 3.

A detent opening is formed on the side of the support base located opposite the mounting surface 11 by the circumferential chamfer 14, which transitions in a funnel-shaped manner into a collar 15, the inside width (W) of which is smaller than the ball diameter (D).

The ball 6 is held in the ball receptacle 16 of the support base 10, which is formed by a central clearance of the elastomer 20, in a form-locked manner.

Above the ball receptacle 16, the elastomer 20 includes the collar 15, which annularly rests against the neck 5.

Above the collar 15, the opening formed by the collar 15 expands radially as a result of the circumferential chamfer 14, which at least partially rests against the chamfer 4 of the shaft.

The ball receptacle 16 is delimited in the direction of the mounting surface 11 of the support base 10 by the reinforcement disk 19, which is embedded in the elastomer 20. The reinforcement disk 19 has a central hole 17 in which the ball underside 7 is rotatably mounted. The hole 17 includes a wall 18, which forms the inner circumference and has a shape that is complementary to the circumferential surface of the ball 6. This facilitates the rotation of the ball 6 within the hole 17, with the contact between the ball 6 and the wall 18 being maintained at a constant level.

Such a rotation is achieved by a pivoting of the shaft 2, the center axis 9 of which, proceeding from the swivel joint formed by the ball 6 and the hole 17, is pivoted at a variable angle relative to the support base 10. This, however, is limited by the hardness of the elastomer 20, which, depending on the increase in the deflection of the center axis 9 of the shaft 2, counteracts increasing resistance. When the force acting on the shaft decreases, the shaft due to the elasticity of the elastomer returns to the starting state thereof, which in the illustrated state is a position oriented perpendicularly to the mounting surface 11.

Figure 2:
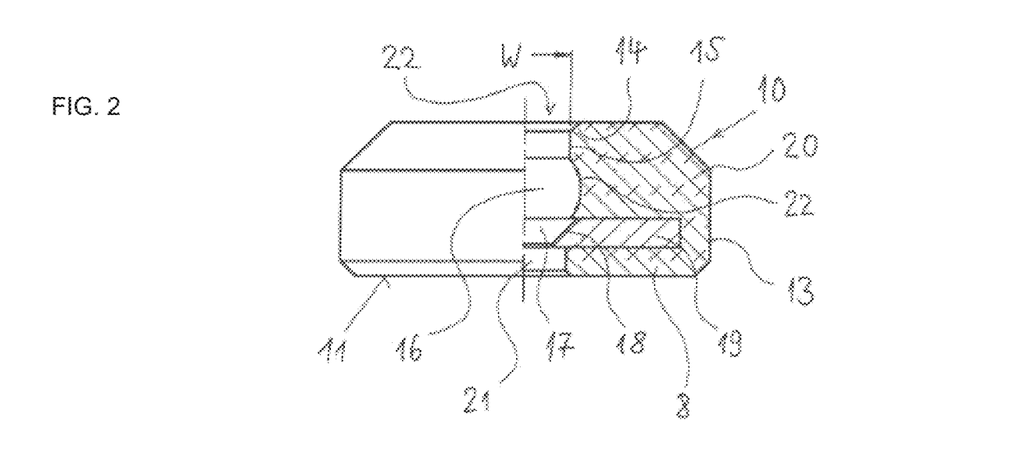
FIG. 2 shows a front view of the partially cut support base.

FIG. 2 shows a support base 10 without a ball inserted therein, wherein the inside geometry of the receiving space 16 can be seen. This space approximately corresponds to the rounding of the ball 6 and is downwardly delimited by the reinforcement disk 19.

The chamfer 14 initially tapers in the axial direction and transitions into the collar 15, which has a cylindrical design. The ball receptacle 16, in which the cavity beneath the collar initially increases radially with a first bearing surface 22, encompassing approximately ⅓ of the ball receptacle, starts beneath the collar 15. The bearing surface 22 meets with a second bearing surface 23, which has a cylindrical design and extends over approximately ⅔ of the ball receptacle 16, before ending on the reinforcement disk 19. In this way, very good insertion and removal of the ball 6 can be achieved in a production operation of the elastomer that is as cost-effective as possible, at comparatively low mold costs.

The reinforcement disk has the central hole 17, including the circular wall 18 tapering in the direction of the mounting surface 11.

The clearance 21, which is present for manufacturing-related reasons, is located beneath the hole 7. This clearance 21 can be hidden by a rubber pad extending across the entire mounting surface 11.

The clearance 21 is situated within the bottom region 8, which is situated beneath the reinforcement disk 19. The bottom region 8 is a subregion of the elastomer 20, which is at least partially separated from the main elastomer 20 by the reinforcement disk 19. This bottom region thus forms an elastomeric support for the reinforcement disk 19 to prevent the reinforcement disk from coming in direct contact with the surface on which the support base rests. This bottom region 8 counteracts the forces introduced into the support base 10 by means of the shaft 2 in a damping and resilient manner.

Figure 3:
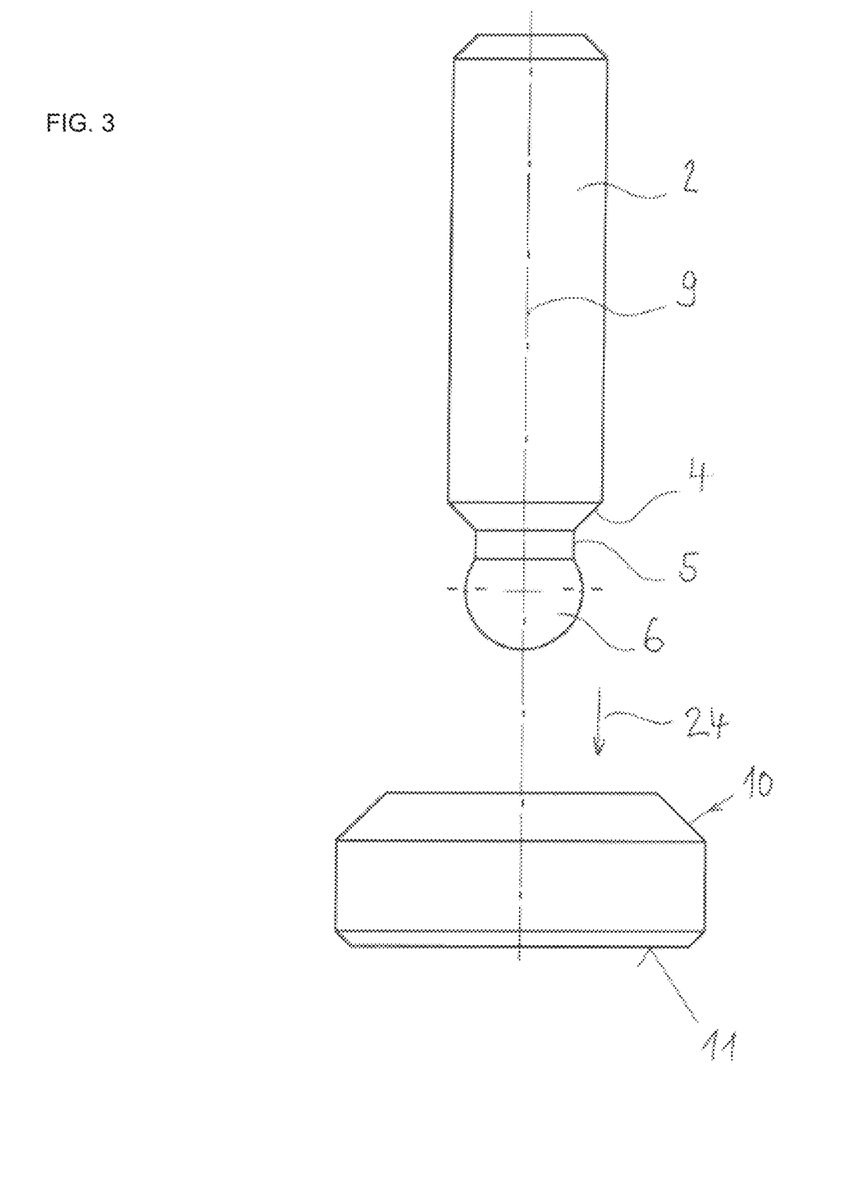
FIG. 3 shows a front view of a shaft and a support base.

FIG. 3 shows an adjustable foot 1 comprising the shaft 2. The shaft has a chamfer 4 in the region of the support base 10, which reduces the diameter of the shaft and transitions into a neck 5, which forms the area having the smallest diameter of the shaft 2. The ball 6, which forms a workpiece-integral part of the shaft 2, adjoins this neck in the longitudinal direction.

The ball 6, the neck 5 and at least a portion of the chamfer 4 are inserted in the direction of the arrow 24 into the support base 10, which is seated with the mounting surface 11 on a surface (not shown).

Figure 4:
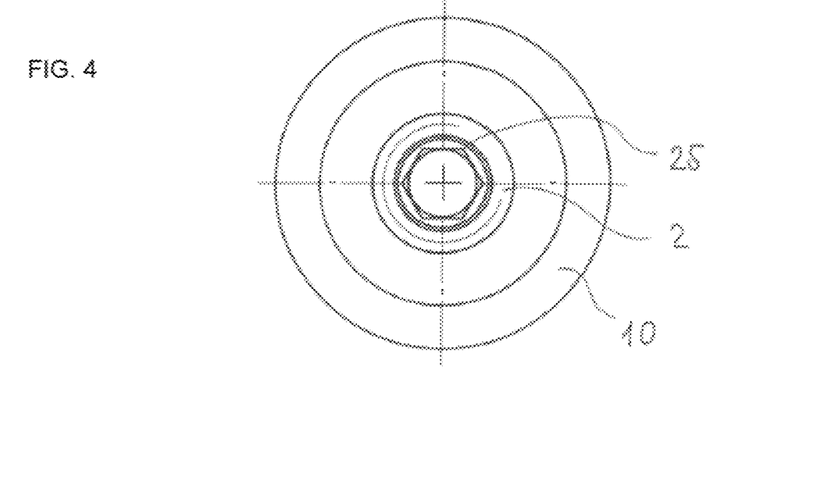
FIG. 4 shows a top view of the adjustable foot.

FIG. 4 shows a top view onto a shaft 2 that is inserted centrally with respect to the support base 10 and comprises, for example, an internal polyhedral or internal round holder 25 for a tool. In this way, the shaft can be rotated about the center axis 9 thereof by way of a tool engagement, which can also take place on an arbitrary other geometry.

Figure 5:
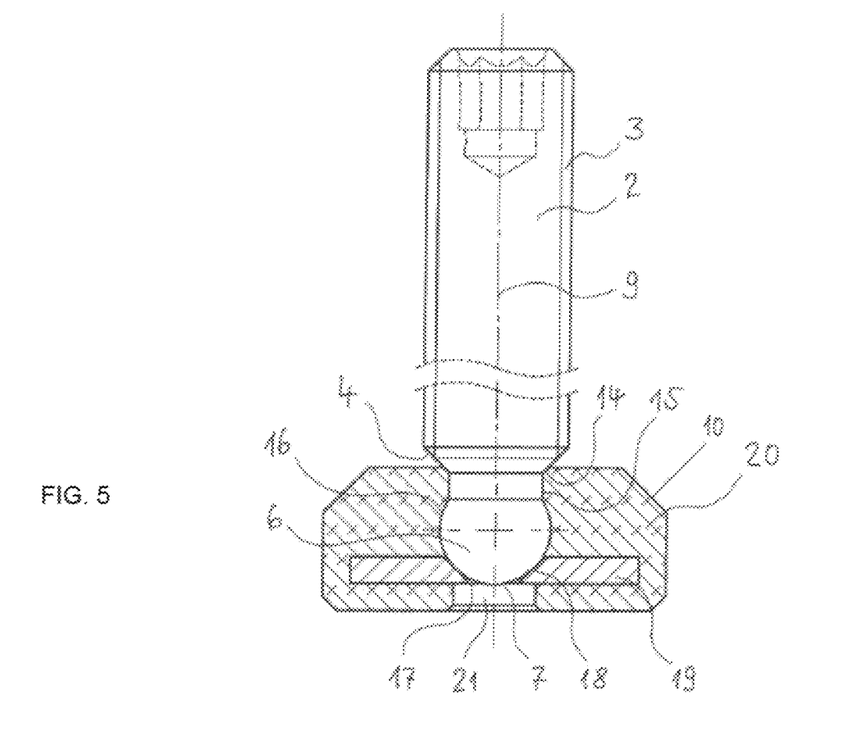
FIG. 5 shows a front view of the partially cut adjustable foot.

FIG. 5 shows a shaft 2 inserted into a support base 10. A detent opening is formed on the side of the support base 10 located opposite the mounting surface 11, by the circumferential chamfer 14, which transitions in a funnel-shaped manner into a collar 15, the inside width (W) of which is smaller than the ball diameter (D).

The ball 6 is held in the ball receptacle 16 of the support base 10, which is formed by a central clearance of the elastomer 20, in a form-locked manner.

The collar 15, which is situated above the ball receptacle 16, rests annularly around the neck 5 after the ball 6 has been inserted.

Above the collar 15, the opening formed by the collar 15 expands radially as a result of the circumferential chamfer 14, which at least partially rests against the chamfer 4 of the shaft.

The ball receptacle 16 is delimited in the direction of the mounting surface 11 of the support base 10 by the reinforcement disk 19, which is embedded in the elastomer 20. The reinforcement disk 19 has a central hole 17 in which the ball underside 7 is rotatably mounted. The hole 17 includes a wall 18, which forms the inner circumference and has a shape that is complementary to the circumferential surface of the ball 6. This facilitates the rotation of the ball 6 within the hole 17, with the contact between the ball 6 and the wall 18 being maintained at a constant level.

Figure 6:
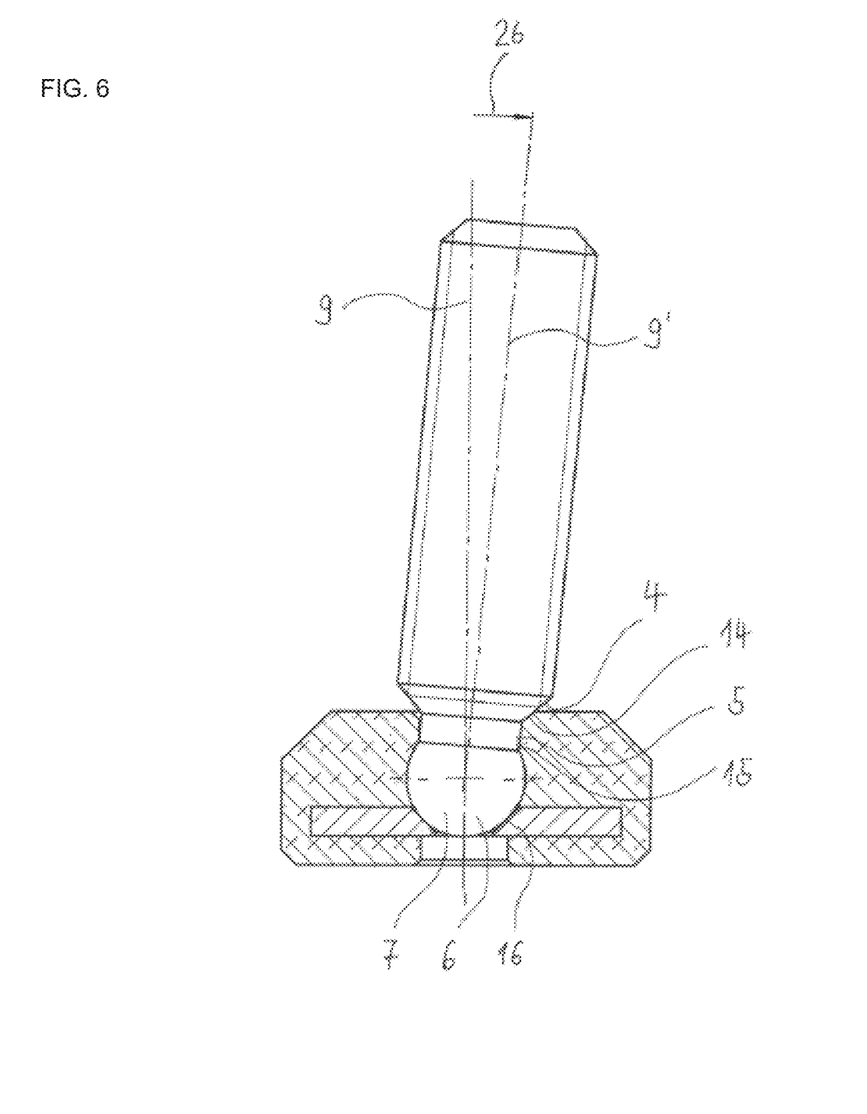
FIG. 6 shows a front view of the partially cut adjustable foot including a deflected shaft.

Such a rotation is achieved by a pivoting of the shaft 2, the center axis 9 of which, proceeding from the swivel joint formed by the ball 6 and the hole 17, is pivoted at a variable angle relative to the support base 10. This is shown in FIG. 6, wherein the original center axis 9, as a result of the deflection 26, transitions into the center axis 9', which is no longer congruent with the axis of symmetry of the support base 10.

This, however, is limited by the hardness of the elastomer 20, which, depending on the increase in the deflection of the center axis 9 of the shaft 2, counteracts increasing resistance. When the force acting on the shaft decreases, the shaft due to the elasticity of the elastomer returns to the starting state thereof, which in the illustrated state according to FIG. 4 is a position oriented perpendicularly to the mounting surface 11.

Figure 7A:
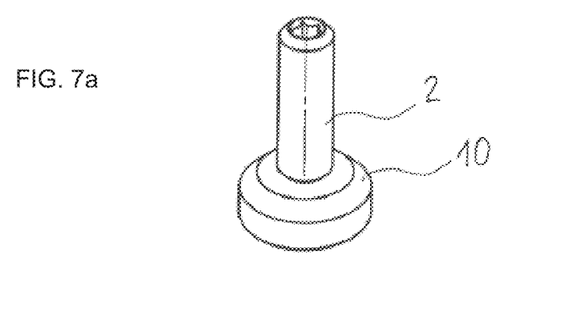
FIGS. 7a to 7c show various perspective views of adjustable feet including differently shaped support bases.
Figure 7B:
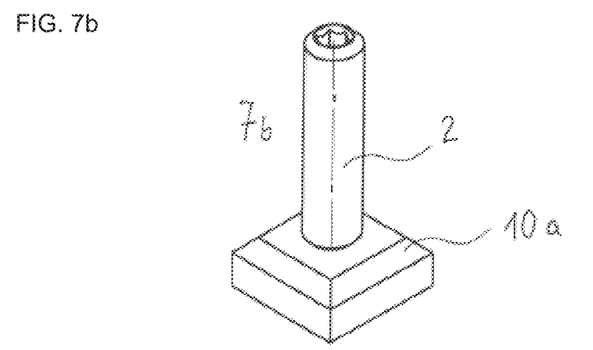
Figure 7C:
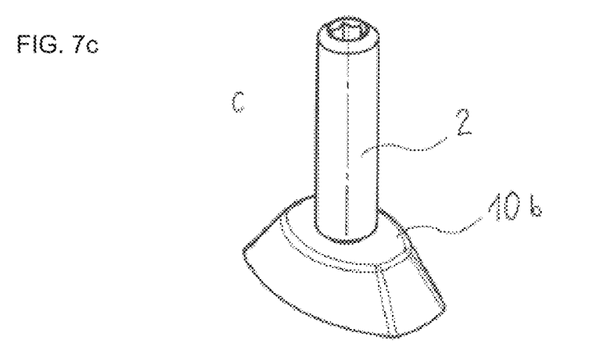

FIGS. 7a to 7c, by way of example, show various shapes of support bases, wherein FIG. 7a shows a round support base 10, FIG. 7b shows an angular support base 10a, and FIG. 7c shows an approximately oval support base 10b.

DRAWING LEGEND 1 adjustable foot
2 shaft
3 thread
4 chamfer
neck
6 ball
7 ball underside
8 bottom region
9, 9' center axis
10, 10a, 10b support base
11 mounting surface
12 rubber pad
13 casing
14 chamfer
collar
16 ball receptacle
17 hole
18 wall
19 reinforcement disk
elastomer
21 clearance
22 first bearing surface
23 second bearing surface
24 direction of arrow
internal polyhedral holder
26 deflection
D diameter of the ball
W inside width of the collar

The invention claimed is:

1. An articulated adjustable foot, comprising:
an at least partially elastomeric support base including a mounting surface to rest on a support surface, and
a ball receptacle, having an opening on one side configured to receive a ball that is attached to an end of a shaft,
a single metal reinforcement disk that delimits the ball receptacle disposed beneath the ball, the metal reinforcement disk being embedded into and integrally joined to an elastomer and having one central hole, in which an underside of the ball is supported, wherein a plane of the single metal reinforcement disk passing through a longitudinal axis of the shaft is parallel to a plane of the at least partially elastomeric support base passing through the longitudinal axis of the shaft,
wherein the central hole includes a wall, which forms an inner circumference and has a size and shape that is complementary to a circumferential surface of the ball.

2. The adjustable foot according to claim 1, wherein the ball is pivotably mounted in the central hole.

3. The adjustable foot according to claim 1, wherein a circumferential region of the central hole in the reinforcement disk rests against a ball diameter, the ball being fittingly engaged in the central hole.

4. An adjustable foot according to claim 1, wherein the reinforcement disk is joined to the elastomer by vulcanization.

5. An adjustable foot according to claim 1, further comprising a neck joined to the ball and extending from the ball, the neck protruding from a shaft, wherein the neck has tapered diameter with respect to a diameter of the ball and the neck and ball comprise a same material.

6. An adjustable foot according to claim 1, further comprising a circumferential chamfer defining a detent opening on a side of the support base located opposite the mounting surface, the opening transitioning in a funnel-shaped manner into a collar, an inside width of which is smaller than a diameter of the ball.

7. An adjustable foot according to claim 1, further comprising an elastomeric plug detent connection comprising the ball and the ball receptacle in the adjustable foot form.

8. An adjustable foot according to claim 1, further comprising a collar defining a circumferential expansion area for expanding the detent opening to a diameter extending around an equator of a ball.

9. An adjustable foot according to claim 1, wherein the elastomer forms a first region between the reinforcement disk and a surface of the support base, and an elastomeric second region between the reinforcement disk and the mounting surface, wherein the elastomeric second region is harder than the first region.

* * * * *